United States Patent
Gratton

(10) Patent No.: US 10,601,730 B2
(45) Date of Patent: *Mar. 24, 2020

(54) AGGREGATED ADAPTIVE BIT RATE STREAMING

(71) Applicant: DISH Technologies L.L.C., Englewood, CO (US)

(72) Inventor: Max S. Gratton, Lakewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,426

(22) Filed: Apr. 12, 2019

(65) Prior Publication Data

US 2019/0238479 A1 Aug. 1, 2019

Related U.S. Application Data

(63) Continuation of application No. 15/649,165, filed on Jul. 13, 2017, now Pat. No. 10,270,708, which is a continuation-in-part of application No. 14/144,711, filed on Dec. 31, 2013, now Pat. No. 9,716,668.

(51) Int. Cl.
*H04L 12/911* (2013.01)
*H04L 12/66* (2006.01)
*H04L 29/06* (2006.01)

(52) U.S. Cl.
CPC .............. *H04L 47/78* (2013.01); *H04L 12/66* (2013.01); *H04L 65/1089* (2013.01); *H04L 65/602* (2013.01); *H04L 65/80* (2013.01)

(58) Field of Classification Search
CPC ..... H04L 47/78; H04L 65/1089; H04L 65/80; H04L 65/602; H04L 12/66
See application file for complete search history.

(56) References Cited

U.S. PATENT DOCUMENTS

| | | | | |
|---|---|---|---|---|
| 9,716,668 | B2 * | 7/2017 | Gratton | .................... H04L 47/78 |
| 10,270,708 | B2 * | 4/2019 | Gratton | .................... H04L 47/78 |
| 2008/0243996 | A1 * | 10/2008 | Wu | ........................ H04L 65/608 709/203 |
| 2013/0007190 | A1 * | 1/2013 | Kumar | ................ H04L 61/2567 709/217 |
| 2013/0024582 | A1 * | 1/2013 | Rodrigues | ........... H04L 12/5601 709/231 |

* cited by examiner

*Primary Examiner* — Walli Z Butt

(74) *Attorney, Agent, or Firm* — Lorenz & Kopf LLP

(57) ABSTRACT

Systems, methods and devices provide efficient bandwidth allocation on a satellite, mobile telephone or other data connection by allowing nodes to share bandwidth for commonly-requested data. A transmission center, uplink or other gateway suitably recognizes when content requests from multiple different nodes are simultaneously requesting delivery of the same content. When the same content is recognized, the gateway device allocates shared bandwidth on the data transmission link for the requested content that is accessible to both the first and second nodes.

20 Claims, 3 Drawing Sheets

AGGREGATED ADAPTIVE BIT RATE STREAMING

PRIORITY CLAIM

Figure 1:
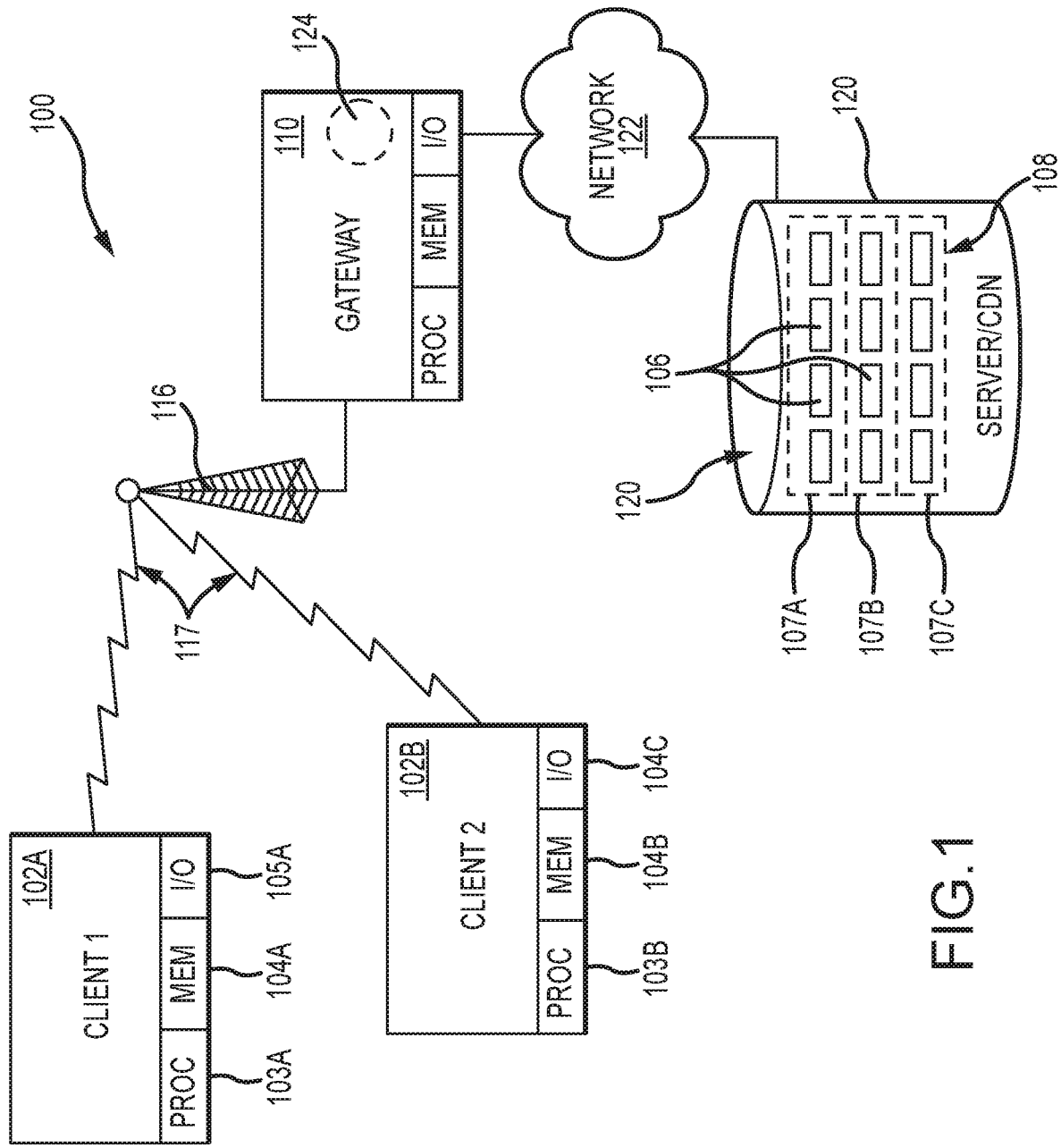

This application is a continuation of U.S. patent application Ser. No. 15/649,165 (now U.S. Pat. No. 10,270,708) filed on Jul. 13, 2017, which is a continuation of U.S. patent application Ser. No. 14/144,722 (now U.S. Pat. No. 9,716,668) filed on Dec. 31, 2013, incorporated herein by reference.

TECHNICAL FIELD

The present disclosure generally relates media streaming, and more particularly relates to systems, devices and methods for efficient aggregation of streaming media content.

BACKGROUND

Streaming media is commonly used to deliver television programs, movies and other digital media content over the Internet and other networks. At present, a variety of streaming audio, video and/or other media content is available to consumers from any number of diverse sources. A large amount of video-on-demand (VOD) content, for example, is now available for network streaming from many different sources. Media streams are also used to deliver other types of media content including live and pre-recorded broadcast television, so-called "Internet (or IP) television", stored media content (e.g., content stored in a remote storage digital video recorder (RSDVR)), placeshifted media content and many others.

As customers watch more and more content that is streamed from an on demand or other remote source, various challenges can arise. In particular, streaming content can consume a large amount of bandwidth, particularly on a satellite, mobile telephone or similar network that has relatively limited bandwidth. As multiple users attempt to stream audio and/or video content over the same network links, the links can easily become stressed, if not overloaded. Multiple users simultaneously viewing a television broadcast, for example, can quickly consume available bandwidth.

It is therefore desirable to efficiently deliver streaming media content from a video-on-demand, RSDVR or other source to various types of remote media devices over limited bandwidth connections. These and other desirable features and characteristics will become apparent from the subsequent detailed description and the appended claims, taken in conjunction with the accompanying drawings and this background section.

BRIEF SUMMARY

Systems, methods and devices provide efficient bandwidth allocation on a satellite, mobile telephone or other data connection by allowing nodes to share bandwidth for commonly-requested data. A transmission center, uplink or other gateway suitably recognizes when content requests from multiple different nodes are simultaneously requesting delivery of the same content. When the same content is recognized, the gateway device allocates shared bandwidth on the data transmission link for the requested content that is accessible to both the first and second nodes. In some embodiments, the shared bandwidth is greater than the bandwidth that would otherwise be allocated to either individual node so that higher quality content can be delivered to the nodes using the shared bandwidth, if desired.

Various embodiments provide a method executable by a gateway device that communicates via a data transmission link. The method suitably comprises processing a first request for content from a first node on the data transmission link; processing a second request for content from a second node on the data transmission link, wherein the second node is different from the first node; recognizing, by the gateway device, that the first request from the first node and the second request from the second node are requesting the same content; and, when the same content is recognized, the gateway device allocating shared bandwidth on the data transmission link for the requested same content, wherein the shared bandwidth is accessible to both the first node and the second node.

Other embodiments provide a gateway device that communicates via a satellite, mobile telephone or other shared communication link, the device comprising a processor, a memory, and an interface to communicate via the communication link, wherein the processor is configured to process a first request for content from a first node on the shared transmission link; process a second request for content from a second node on the data transmission link, wherein the second node is different from the first node; recognize that the first request from the first node and the second request from the second node are requesting the same content; and, when the same content is recognized, allocate shared bandwidth on the data transmission link for the requested same content, wherein the shared bandwidth is accessible to both the first node and the second node.

Other embodiments provide a method executable by a satellite gateway device that controls access to a satellite communications link. The method suitably comprises recognizing, by the satellite gateway device, that a first node communicating on the satellite communications link and a second node also communicating on the satellite communications link are requesting the same content; and, when the same content is recognized, the satellite gateway device allocating shared bandwidth on the satellite communications link for the same content, wherein the shared bandwidth on the satellite communications link is accessible to both the first node and the second node.

Other embodiments could provide systems, devices, gateways, remote devices, content sources, processes, methods and/or the like that perform these or other functions. Various embodiments, aspects and features are described in detail below.

BRIEF DESCRIPTION OF THE DRAWING FIGURES

Figure 2:
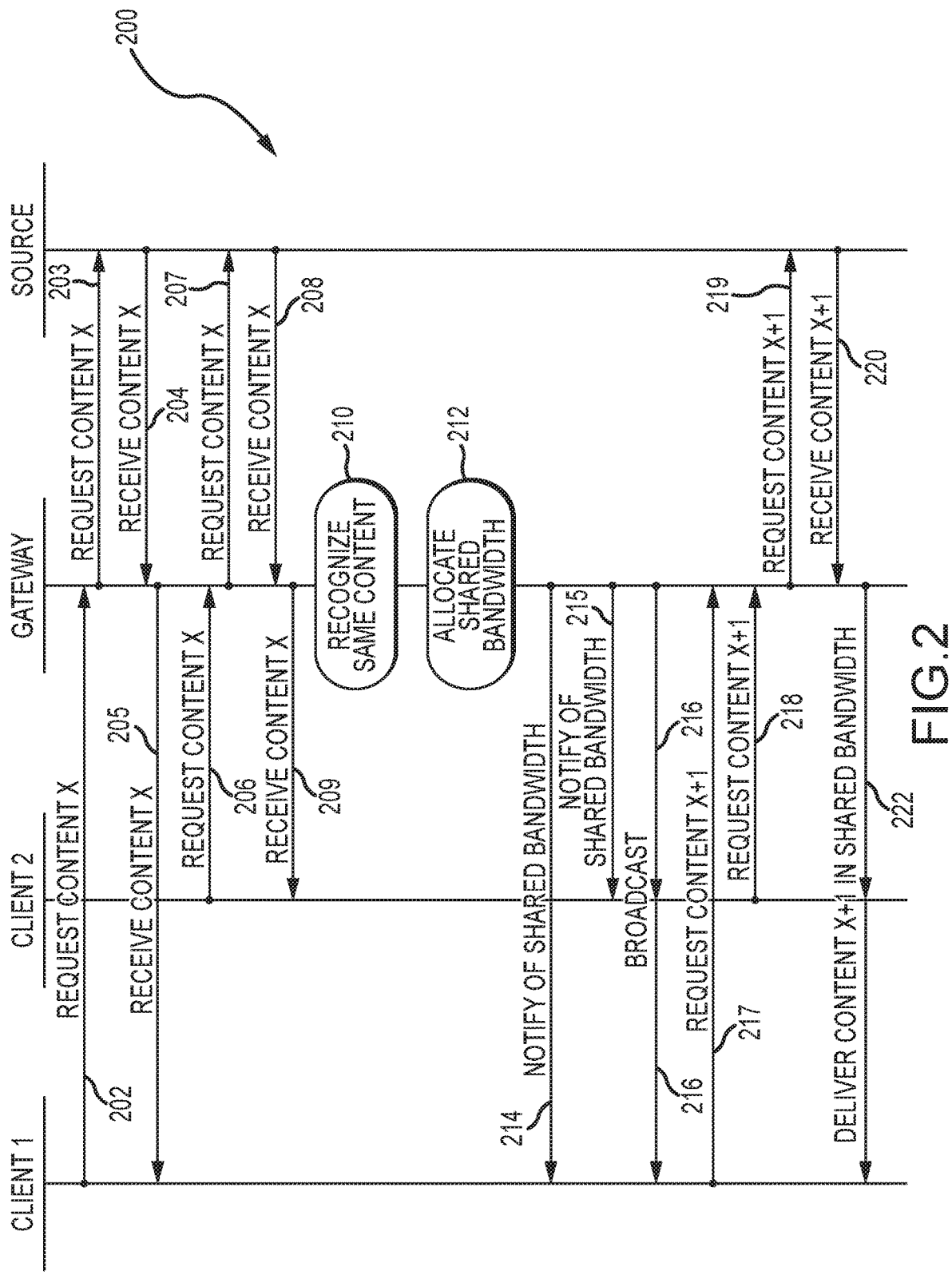
Figure 3:
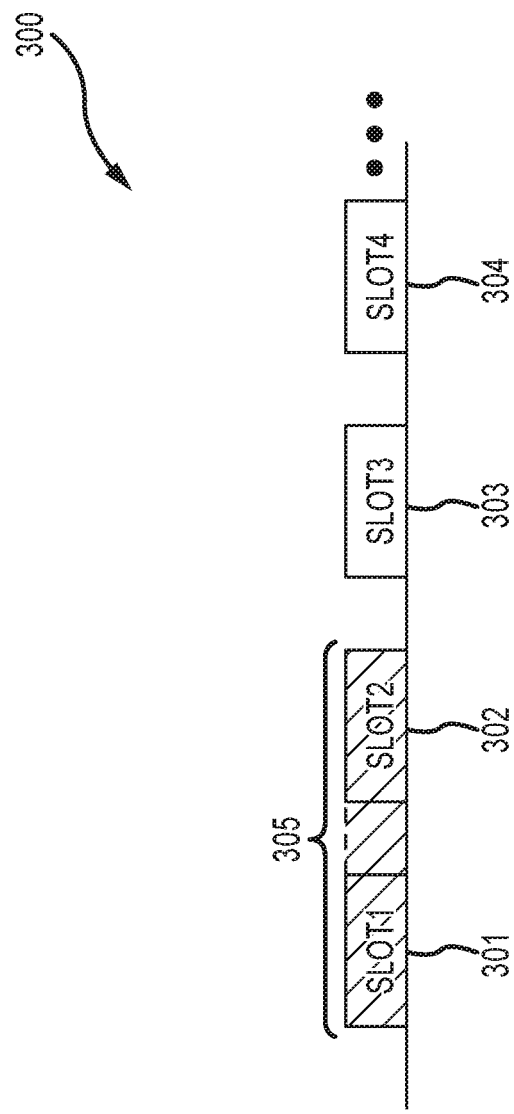

Exemplary embodiments will hereinafter be described in conjunction with the following drawing figures, wherein like numerals denote like elements, and FIG. 1 is a block diagram of an exemplary system for media streams from a content source over a satellite, mobile phone or other network with limited bandwidth;

FIG. 2 is a data flow diagram showing an example of a process for delivering a media streams over shared bandwidth; and FIG. 3 is a timing diagram showing an exemplary technique for sharing timeslots of a time multiplexed transmission scheme.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

In many network environments, bandwidth that is available to individual nodes and/or users can be limited. In a satellite or mobile telephone environment, for example, the total bandwidth of a communication link is shared between many different users, thereby limiting the amount of bandwidth available to any particular user. These limits, in turn, can restrict the quality of the user experience. A user attempting to obtain streaming video over a shared communication link, for example, may not be able to obtain the best video quality that would otherwise be possible if a larger share of the link's bandwidth were available to that user.

According to various embodiments, multiple nodes that simultaneously receive the same content over a bandwidth-limited data connection can be encouraged to share bandwidth for more efficient allocation and/or to obtain better quality data. If multiple users of a data connection are simultaneously requesting unicasts of the same video content, for example, then the unicasts could be efficiently replaced with a broadcast of the same content that is accessible to all of the users requesting the common data. Moreover, the broadcast could provide a better quality copy of the content than would otherwise be available since the total bandwidth is being conserved through sharing. Put another way, some or all of the bandwidth that is conserved through sharing of common data can be re-allocated to improving the quality of the shared content, if desired. Additional details are presented below.

Turning to the drawing figures and with initial reference to FIG. 1, an exemplary system 100 allows one or more clients 102A-B to request and obtain adaptive or non-adaptive content 108 from a remote content source 120 via a communications link 116. A gateway device 110 suitably recognizes when multiple client devices 102A-B are simultaneously requesting the same content 108, and dynamically assigns a shared portion of broadcast 117 to the shared content. This allows all of the media players 102 that are receiving common content to share at least a portion of the broadcast 117, thereby potentially freeing excess bandwidth for other purposes. In some embodiments, gateway 110 apportions some or all of the excess bandwidth to the shared media content 108 so that client devices 102 that use the shared bandwidth are able to obtain better quality content 108, as appropriate.

Communications link 116 may represent, for example, a satellite link, a cellular or other telephone link, a wired or wireless networking link, or the like. In many embodiments, communication link 116 communicates with the relevant client devices 102A-B via a common spot beam or other broadcast 117 that is simultaneously received by the multiple client devices 102A-B. Typically, broadcast 117 multiplexes the various data streams that are intended for the various devices 102A-B using any sort of time, phase, frequency, code or other modulation techniques, as desired. Communications link 116 may support bi-directional communications with the client devices 102A-B in some embodiments; in other embodiments (e.g., in a direct broadcast satellite (DBS) television implementation), communication link 116 may support only uni-directional broadcasts from the gateway 110 to the client devices 102A-B. In such cases the clients 102A-B would typically communicate with the gateway and/or content source 108 via a separate "back channel", such as a telephone or broadband network connection.

Clients 102A-B represent any number of client devices each capable of receiving content 108 via communications link 116. In various embodiments, clients 102A-C represent computer systems, mobile telephones, tablet computers, game playing devices, home entertainment components or any other devices capable of receiving communications via link 116. To that end, client devices 102A-B typically include one or more processors 103, memories 104 and input/output features 105 that would be typically found in conventional electronic and computing devices. In some embodiments, clients 102A-B may include receiving devices such as wireless or satellite modems that receive and distribute content to other devices on a local area network (LAN) or the like.

Gateway system 110 is a computer system that controls communications on link 116. In various embodiments, gateway 110 is incorporated within uplink controller for a satellite connection or within a cell controller for a cellular telephone system. Other embodiments may implement gateway 110 within any sort of router, access point or other network control device as appropriate. Gateway system 110 typically includes one or more processors 113, memory 114 and input/output features 115 to support the various functions associated with controlling link 116. In various embodiments, a software module 124 executing within gateway system 110 assigns timeslots or other bandwidth on broadcasts 117. Software application 124 typically resides within memory 114 and/or in mass storage available via interfaces 115 for execution on processor 115. Additional detail about various functions carried out by software 124 is provided below.

FIG. 1 shows gateway 110 providing an interface between link 116 and the internet or another network 122. In various embodiments, connection 116 allows clients 102A-B to interact seamlessly with network 122 to request and obtain streaming media, web pages, messages and/or other content as desired.

Communications over broadcast 117 may be established and maintained in any manner. In the example of FIG. 1, client devices 102A-B each request media content 108 from a content source 120. Media content 108 may represent, for example, live broadcasts of television programming (e.g., IPTV), television programs stored in a remote storage digital video recorder (RSDVR) or the like, video-on-demand (VOD) content, or other media content as desired. To that end, content source 120 represents any sort of VOD, RSDVR, IPTV, placeshifting and/or other server that provides media content on network 122. Various embodiments may distribute the media content 108 using a content delivery network (CDN) or the like. In some embodiments, content source 120 may be configured as a passive file server device, such as an HTTP server. In other embodiments, the content source 120 may be configured with the ability to enforce business rules and open connections with other devices on the network, such as to push content to media clients 102A-B.

Media content transmitted from content source 120 to remote devices 102A-B may be formatted and structured in any manner, including any number of proprietary or non-proprietary formats. In various embodiments, media programs 108 are encoded into an adaptive streaming format that allows each client 102A-B to adapt the content stream in response to changing network conditions, processing resources, and/or any number of other factors. Other embodiments may use non-adaptive streams, placeshifting streams, or any other media streaming techniques as desired.

In some implementations, content 108 is transferred over link 116 using TCP or UDP structures that facilitate conventional HTTP "get" and "put" instructions to be processed by content source 120. Alternatively, content may be transferred using remote streaming transport protocol (RSTP) sessions, video streaming sessions, and/or any other standard or proprietary connections as desired.

The example illustrated in FIG. 1 shows media content 108 represented as a series of separate segments 106 organized into multiple segment sets 105A-C. Sets 105A-C of segments 106 may be encoded to each represent the same media program 108 in its entirety, but with different bit rates, frame rates, resolution and/or other levels of quality. Typically, each set 105A-C is made up of smaller segments 106 that each represent a small portion of the program content with a single data file. Sets 105A-C are typically encoded so that segments 106 of the different sets 105A-C are interchangeable with each other, often using a common timing index. This allows a client media player to mix and match segments 106 from different sets 105A-C to create a media stream that effectively adapts as network conditions or other conditions change. Several examples of adaptive streaming systems, devices and techniques are described in US Patent Publication No. 2008/0195743. Other embodiments could use different encoding structures or techniques, including non-adaptive techniques, as desired.

In conventional adaptive streaming, a media player application executing on one or more client devices 102A-B contains intelligent logic to select appropriate segments 106 as needed to obtain and playback the media program 108. As noted above, segments 106 may be interchangeable between sets 105A-C so that higher quality segments 106 may be seamlessly intermixed with lower quality segments 106 to reflect changing network or other conditions. In some implementations, the media client 102A-B initially obtains a digest or other description of the available segments 106 so that the client itself can select and request the particular segments 106 that are desired. Since the segments 106 are typically stored as separate files, segment requests may take the form of conventional hypertext transport protocol (HTTP) constructs (e.g., HTTP "get" instructions) or the like. Such constructs are readily routable on data networks and can be served by conventional CDN or other web-type servers 110, thereby providing a convenient mechanism for distributing adaptive media streams to a variety of different client devices 102A-B. However, in other embodiments, a media file may not be segmented prior to distribution, and instead, a media client 102 may be configured to request particular memory locations or other resources from a source device. Other embodiments may be formulated as well.

In various embodiments, software 124 executing in gateway 110 is able to recognize when multiple clients 102A-B receiving the same broadcast 117 from link 116 are simultaneously requesting the same content 108. Clients 102A-B may be each requesting the same segments 106 of a live television broadcast stream, for example. In such cases, gateway 110 may be able to conserve bandwidth within broadcast 117 by allocating shared time to the commonly-requested content. Commonly-requested segments 106, for example, could be placed in a timeslot or other location within broadcast 117 that is available to all of the clients 102 requesting that segment 106. A particular time or code slot of a satellite or cellular transmission, for example, could be shared between multiple recipients 102 as desired. Additional detail about various embodiments is provided below.

FIG. 2 provides additional detail about an exemplary process 200 to allocate shared bandwidth on broadcast 117.

FIG. 2 illustrates several examples of functions that may be performed by the various devices in system 100, as well as examples of messages that may be passed between devices as desired. The exemplary process 200 illustrated in FIG. 2 may be supplemented or modified to create any number of equivalent implementations.

As shown in FIG. 2, client 102A initially sends a request 202 for content 108 on source 120. The request 202 may identify a particular segment 106 of a video stream 107, for example, that corresponds to a portion of content 108 encoded at a particular quality. In some embodiments, gateway 110 receives the request 202 and forwards it to content source 120 as request 203, as appropriate. Content source 108 suitably receives the request 203 and provides the requested segment 106 or other content in a response 204. This response may be initially returned as a unicast 205 across link 116, as appropriate.

In the example of FIG. 2, client 102B places requests 206 for the same content 108 at essentially the same time as client 102A. In a conventional implementation, gateway 110 may forward the request 206 as request 207 and process any replies 208 from source 120 as a separate unicast 209. FIG. 2 shows gateway 110 acting as an intermediary to receive requests 202, 206 over link 116 and to forward requests 203, 207 (respectively) on network 122. Alternately, the requests 202, 203 may be directly provided from clients 102A-B to content source 108 via link 116, or via any appropriate backchannel as desired, without additional processing by gateway 110.

In the example above, unicasts 205 and 209 are considered to be duplicates in that they provide essentially the same content 108 at essentially the same time, albeit to different recipients of broadcast 117. Transmitting both unicasts 205 and 209 on broadcast 117 consumes more bandwidth than would be required if clients 102A and 102B were able to simultaneously receive the same requested content 108.

Various embodiments of gateway 110 therefore recognize that multiple clients 102A-B are simultaneously requesting the same media segments or other content (function 210). Note that the requests do not need to be perfectly simultaneous; variances of a few seconds or more may be permissible, depending upon the application and environment. Moreover, the particular segments 106 of content 108 do not need to be exactly the same in all instances. Some embodiments may recognize simultaneous requests for the same time portions of content 108 even if the encoding quality of the various segments 106 requested is not exactly the same. Simultaneous requests for the same content may be recognized in any manner. In various embodiments, segments 106 may be identified with an identification code that can be tracked within gateway 110; these segment identifiers may be contained in segment requests 202, 206, or in the response packets 204, 208, or in other messages or packets as appropriate. Alternately, duplicate requests 202, 206 and/or responses 204, 208 may be recognized through common URLs, common file names, common packet sizes, and/or other common features. Duplicate requests for the same media content 108 may be particularly common for live television broadcasts, wherein users of multiple clients 102A-B are simultaneously tuned in to the same program at the same time.

When gateway 110 recognizes multiple requests for the same content, gateway 110 may responsively allocate a shared portion of broadcast 117 to the common content (function 212). This shared portion could, in turn, be commonly received by both clients 102A-B that requested the common content rather than each client 102A-B receiving a separate copy of the same content. Shared bandwidth could be allocated in any manner. All recipients of a particular content stream could be assigned to the same time slot of a time domain multiplexed signal, for example, or the same code of a code multiplexed signal.

In various embodiments, multiple timeslots could be assigned to the same data stream, thereby allowing additional bandwidth on broadcast 117 to be assigned to the shared content. This could allow, for example, segments 106 from higher quality sets 107 of the same content 108 to be delivered in place of the lower quality segments 106 requested by the clients 102A-B. Some or all of the bandwidth conserved by sharing, then, could be re-allocated to providing improved quality. Alternatively, excess bandwidth could be used for other purposes. Adaptive media client programs may then adapt their subsequent requests for future segments based upon the additional bandwidth, as appropriate.

Gateway 110 notifies clients 102A and 102B of the shared bandwidth in any manner (functions 214, 215) so that the clients 102A-B are each able to locate and receive the shared content in broadcast 216. Notifications 214, 215 may identify a timeslot or CDMA code of the shared data, for example, and may also indicate if the quality has been improved or otherwise modified from the quality expected by the requesting client 102. Notifications 214,215 may be transmitted in-band or out-of-band, as desired, and in accordance with the transmission scheme used by link 116. An in-band notification 214, 215, for example, could be provided on an assigned slot or channel that is allocated to the appropriate recipient 102A-B on communication link 116. An out-of-band notification could be provide via a separate control channel or slot of link 116, or in any other manner (including a separate telephone or other backchannel, as desired). Notifications 214, 215 could be contained within broadcasts accessible to all recipients of link 116, in some embodiments, so that other clients 102 could also tune in to the shared broadcast if desired.

With continued reference to FIG. 2, clients 102A-B submit subsequent requests 217, 218 for segments 106 of the content 108 as desired. In various embodiments, clients 102A-B may request higher-quality segments 106 of the content than were previously requested due to the improved bandwidth utilization on broadcast 117. These bandwidth improvements may be automatically recognized by the media clients 102A-B in some implementations, or the quality may be expressly increased in response to notifications 214, 215, as desired.

In various embodiments, gateway 110 recognizes the requests 214, 215 for the same content and takes appropriate actions to streamline the delivery of the commonly-requested data. In such cases, it may not typically be necessary for gateway 110 to place multiple requests for the same segment 106, for example. To the contrary, gateway 110 places a single request 219 for the newly-received content; this request is returned by the content source 120 in response 220, and the received content is placed in the shared slot of broadcast 222 for reception by all of the clients 102A-B receiving the common data, as appropriate.

FIG. 3 shows an exemplary time multiplexing scheme 300 in which one or more timeslots 301-304 are shared by multiple recipients. As noted above, in-band or out-of-band signaling from gateway 110 would indicate a timeslot 301-304 to be used by each recipient client device 102A-B receiving the broadcast 117. Conventional time domain multiplexing (TDM) would typically assign one timeslot to each receiving node. By assigning a shared timeslot (e.g., slot 301) to multiple recipients, however, shared content could be delivered within the slot, thereby eliminating the need to repeat the same transmission in multiple timeslots.

Further, multiple timeslots could be allocated to multiple recipients. FIG. 3 shows slots 301 and 302, for example, as carrying data that could be commonly received by multiple clients 102A-B; that is, multiple clients 102A-B could receive data on multiple timeslots 301, 302 of scheme 300, thereby effectively creating a larger timeslot 305 for shared content. This larger timeslot 305 could be used to deliver larger segments 106 (i.e., segments having higher encoding quality), for example, or for any other purpose. In other embodiments, one of the shared timeslots (e.g., slot 301) could be used for previously-requested data, and one or more additional timeslots (e.g., slot 302) could be used for predictive data (e.g., future segments 106 of the same sets 107A-C as previously requested segments 106). Clients 102A-B may be able to receive and process these predictive segments 106, thereby reducing the number of requests 202, 206 that would otherwise be placed to content source 120.

The foregoing discussion therefore considers various systems, devices and methods to efficiently deliver common media content to multiple nodes by using shared bandwidth on a communications link. Various benefits and advantages may be realized from the different embodiments described herein.

The general concepts set forth herein may be adapted to any number of equivalent embodiments. Although the discussion herein frequently considers communication link 116 to be a satellite, mobile telephone or similar link, for example, equivalent concepts could be applied to other public/private/hybrid networks, including the Internet, any public or private data network, and/or the like. Further, although certain adaptive streaming techniques are frequently used as examples herein, it is not necessary to use these specific techniques in all implementations. Many other adaptive or non-adaptive streaming techniques could be equivalently used. Additionally, other techniques for sharing bandwidth between multiple nodes on a broadcast-type network could be formulated in additional to those expressly set forth herein. Many other enhancements, modifications and other changes could be made to the examples presented herein to create a wide array of alternate but equivalent embodiments.

The term "exemplary" is used herein to refer to an example, instance or illustration that may have any number of alternates. Any implementation described herein as exemplary is not necessarily to be construed as preferred or advantageous over other implementations, nor is it intended to represent a model that must necessarily be duplicated. While several "exemplary embodiments" have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a gateway device that communicates with a server via a first data link and with a plurality of client nodes via a second data link that is separate from the first data link, the method comprising:

receiving, by the gateway device, a first request from a first client node on the first data link to obtain content from the server on the second data link on behalf of the first client node;

receiving, by the gateway device, a second request for content from a second client node on the second data link to obtain content from the server on the network on behalf of the second client node, wherein the second client node is different from the first client node;

recognizing, by the gateway device, that the first request from the first client node and the second request from the second client node are requesting the same content from the server on the first data link; and when the same content is recognized, the gateway device placing a single request via the first data link to obtain the content from the server, and, upon receipt of the content from the server, simultaneously providing the received content to the first and the second nodes via shared bandwidth of the second data link.

2. The method of claim 1 further comprising the gateway device allocating the shared bandwidth for the requested same content to the first and second client nodes via the second data link.

3. The method of claim 2 further comprising processing subsequent requests for the same content from the first and second client nodes by the gateway device using the shared bandwidth.

4. The method of claim 1 wherein an amount of the shared bandwidth is allocated to be greater than an amount of bandwidth allocated to unshared data.

5. The method of claim 1 wherein the second data link is a satellite link and wherein the shared bandwidth is simultaneously broadcast to both the first client node and the second client node in a shared beam of the satellite link.

6. The method of claim 1 wherein the second data link is a time multiplexed link having a plurality of timeslots, and wherein the shared bandwidth comprises at least one timeslot on the time multiplexed link having greater bandwidth than the timeslots allocated to unshared data.

7. The method of claim 1 wherein the second data link is a time multiplexed link, and wherein the shared bandwidth comprises a plurality of timeslots accessible to both the first client node and the second client node.

8. The method of claim 1 wherein the second data link is a time multiplexed link having a plurality of timeslots, and wherein one of the timeslots represents the shared bandwidth to provide the requested content to both the first client node and the second client node and wherein another of the timeslots provides subsequent content that follows the requested content to both the first and second client nodes.

9. The method of claim 1 wherein the first data link is a connection to a wide area network, and wherein the second data link is a connection to a local area network.

10. The method of claim 1 wherein same content requested by the first node and the second node comprises the same segments of a live television broadcast streams.

11. A gateway device that communicates with a server via a first data link and with a plurality of client nodes via a second data link that is separate from the first data link, the gateway device comprising a processor, a memory, a first interface to communicate with the first data link and a second interface to communicate via the second data link, wherein the processor is configured to:

receive, by the gateway device, a first request from a first client node on the second data link to obtain content from the server on the first data link on behalf of the first client node;

receive, by the gateway device, a second request from a second client node on the second data link to obtain content from the server on the first data link on behalf of the second client node, wherein the second client node is different from the first client node;

recognize that the first request from the first client node and the second request from the second client node are requesting the same content from the server; and when the same content is recognized, place a single request via the first data link to obtain the content from the server, and simultaneously provide the obtained same content to both the first client node and the second client node via the second data link.

12. The gateway device of claim ii wherein the processor is further configured to allocate shared bandwidth on the second data link to the first and second nodes, and to notify the first and second client nodes of the allocated shared bandwidth for the requested same content.

13. The gateway device of claim 12 wherein the processor is further configured to process subsequent requests for the same content from the first and second client nodes by the gateway device using the shared bandwidth.

14. The gateway device of claim 12 wherein an amount of the shared bandwidth is allocated to be greater than an amount of bandwidth allocated to unshared data.

15. The gateway device of claim 12 wherein the communication link is a satellite link and wherein the shared bandwidth is broadcast to both the first client node and the second client node in a shared beam of the satellite link.

16. The gateway device of claim 12 wherein the communication link is a time multiplexed link having a plurality of timeslots, and wherein the shared bandwidth comprises at least one timeslot on the time multiplexed link having greater bandwidth than the timeslots allocated to unshared data.

17. The gateway device of claim 12 wherein the communication link is a time multiplexed link, and wherein the shared bandwidth comprises a plurality of timeslots accessible to both the first client node and the second client node.

18. The gateway device of claim 12 wherein the communication link is a time multiplexed link having a plurality of timeslots, and wherein one of the timeslots represents the shared bandwidth to provide the requested content to both the first client node and the second client node and wherein another of the timeslots provides subsequent content that follows the requested content to both the first and second client nodes.

19. The gateway device of claim ii wherein the first data link is a connection to a wide area network, and wherein the second data link is a connection to a local area network.

20. The gateway device of claim ii wherein same content requested by the first node and the second node comprises the same segments of a live television broadcast streams.

* * * * *